Dec. 14, 1948.  A. O. C. NIER ET AL  2,456,426
MASS SPECTROMETER SYSTEM
Filed Aug. 8, 1944
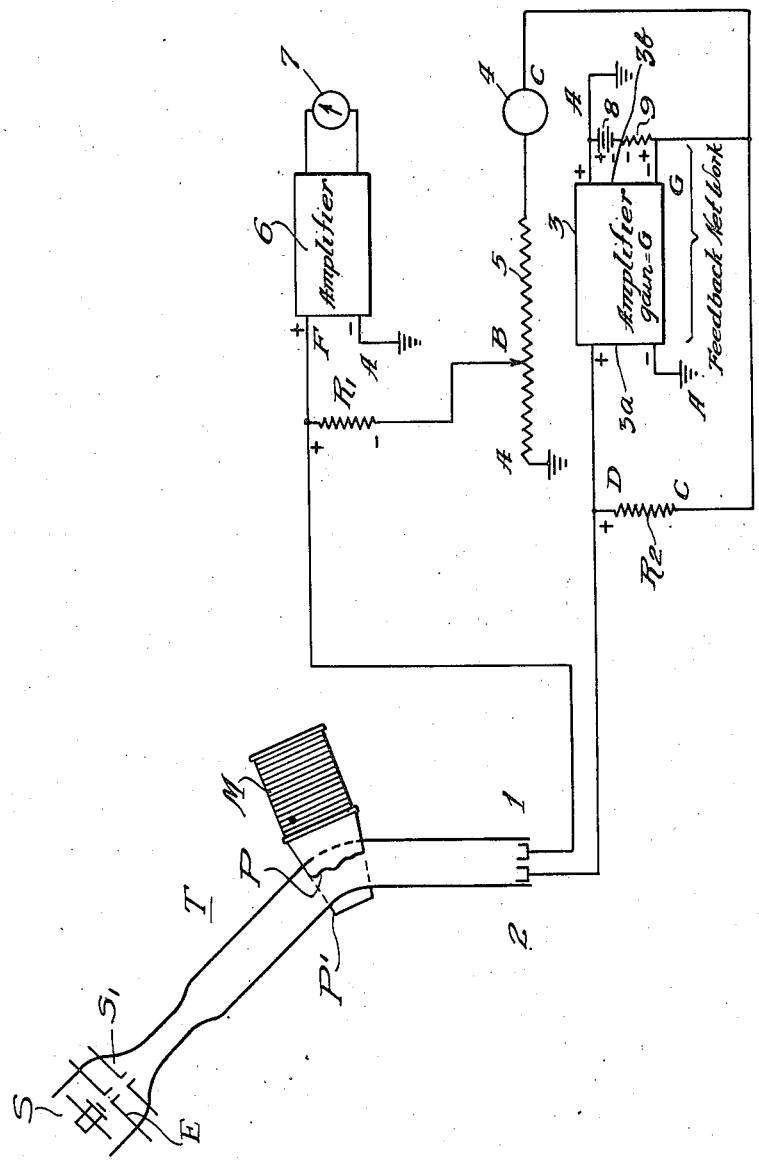
Inventors:
Alfred O.C. Nier
Edward P. Ney
By Robert A. Lavender
Attorney:

Patented Dec. 14, 1948

2,456,426

UNITED STATES PATENT OFFICE 2,456,426

MASS SPECTROMETER SYSTEM

Alfred O. C. Nier, New York, N. Y., and Edward P. Ney, Charlottesville, Va., assignors to the United States of America as represented by the United States Atomic Energy Commission Application August 8, 1944, Serial No. 548,588

12 Claims. (Cl. 250—41.9)

Our invention relates to an electrical measuring device for measuring the relative abundances of components of small samples of material. More specifically, it relates to an electrical system for measuring the ratio of ion currents produced in a device that separates or classifies ions in accordance with their mass-to-charge ratios, for example, the ratio of currents of the ions that are produced by electron impact in a gas or vapor being studied in a mass spectrometer and that are collected by collector electrodes in such mass spectrometer. Although the invention is useful for measuring ratios of currents of various ions, including those of the heaviest elements, it is particularly suitable for measuring the abundance ratio of light elements or isotopes having an appreciable percentage difference in mass, such as an ion having a mass number of 3 (such as an ionized molecule having a deuterium and hydrogen ion) and another ion having a mass number of 2 (such as hydrogen). With such a device, for example, the abundance of small amounts of deuterium occurring in hydrogen may be readily measured.

In the past, various schemes have been used for measuring ion currents collected in a mass spectrometer, but these generally have had the disadvantages of requiring separate measurements of each of the ion currents and of giving readings which fluctuate with variations in the current intensity of the collected currents and of failing ultimately to give a precise ratio of collected ion currents, or of being delicate to use, cumbersome to adjust or otherwise limited in application.

An object of our invention is to provide an electrical measuring device for giving, in a single reading, a precise measurement of the ratio of two ion currents produced by electron impact in a gas or vapor being studied in a mass spectrometer which is independent of fluctuations of the intensities of said currents when said fluctuations occur simultaneously.

Another object of our invention is to provide an electrical system for comparing two positive voltages by the reversal of one of the voltages and the comparison of these opposite voltages on a potentiometer resistor.

Other objects of our invention will become more apparent from a study of the specification and drawing in which the single figure is a schematic circuit showing by way of example a measuring device or system following the teachings of our invention for measuring the ratio of two ion currents collected by a pair of collecting electrodes in a mass spectrometer.

Referring more particularly to the drawing, S denotes an ion source which is contained in an evacuated mass spectrometer tube T and which forms positive ions from materials being analyzed in a manner well known in the art, namely, by electron impact in the gas by electrons emanating from a heated filament and projected toward and onto an electron trap (not shown). Such positive ions are accelerated by an accelerating electrode E having a high negative potential applied thereto—e. g., conveniently by grounding the electrode E and maintaining the filament and trap, or other suitable means in the source, at a high positive potential, and the ions are generally collimated by slits such as $S_1$. The specific details of the ion source form no part of the present invention. By means of an electromagnet M having pole pieces P and P' parallel to the plane of the drawing, the positive ions of different masses are deflected by different amounts according to their mass-to-charge ratio, in a manner well known in the art, and ions of different masses are effectively separated into different ion beams. By providing a pair of collecting electrodes (or collectors) 1 and 2, the positive ion currents of the materials of different masses are separately collected. For example, ion currents of a material having a mass of 3 may be collected by collector 1, while a material having a mass of 2 may be collected by collector 2. The currents received by the collectors 1 and 2 pass respectively through resistors $R_1$ and $R_2$ and other instrumentalities hereinafter described to ground, and amplifiers 6 and 3, which may be of appropriate, conventional electronic type, have their inputs respectively connected between the collectors 1 and 2, and ground. It will be appreciated that the amplifiers may, for example, be of the so-called D. C. type and each include one or more tubes of appropriate sensitivity and stability—e. g., for use with a small spectrometer as described, the amplifier 6 may comprise a tube (not shown) of the so-called electrometer type, sensitive to very minute voltage changes.

An ion current falling on collector 2 causes a voltage drop across resistor $R_2$ of magnitude $V_{DC} = i_2 R_2$ where $i_2$ represents the ion current falling on collector 2. If G represents the voltage amplification or gain of the amplifier 3 of any conventional type, represented in block diagram form, and connected in a negative feedback network which includes also a battery 8 and resistor 9, then:

$$V_{DA} = V_{DC} - G V_{DA}$$

solving:

$$V_{DA} = V_{DC}/(1+G)$$

and:

$$V_{AC} = G V_{DA} = V_{DC} \frac{(G)}{(1+G)}$$

Since G is very large, ordinarily about 500 or 1000, it will be seen that numerically $V_{AC}$ and $V_{DC}$ are so nearly equal that they may be considered as equal.

It can also be seen that the voltage $V_{DA}$ is smaller than $V_{DC}$ by a factor of the order of $$G.\left(V_{DA}=\frac{V_{DC}}{1+G}\right)$$

It can be shown rather easily as a direct consequence of the above that if all the input capacitance were to occur across DA, the input time constant would be reduced by a factor of $(G+1)$, over that obtained by multiplying $R_2$ by the capacitance from D to A.

This makes the circuit respond more rapidly and means that the time constant of the system will be limited by the product of $R_2$ by the capacitance from D to C if $R_2$ is very large. Another advantage of the feedback system and also a consequence of the fact that $$V_{DA}=\frac{V_{DC}}{1+G}$$

is that the input resistance of the first vacuum tube in amplifier 3 need not be as high as in a conventional electrometer such as might be indicated by 6 where the high resistance (here $R_1$) appears from grid to ground (cathode). In the amplifier 3 in the ideal case the output of the amplifier behaves as if the resistor $R_2$ were in parallel with a resistance $(G+1)$ times as great as the input resistance of the first tube in 3.

It will also be seen that the signal which on the input 3a of the amplifier of the feedback network was positive with respect to ground has been transformed on the output 3b to one which is negative with respect to ground (as denoted by the symbols + and at the output 3b). Since the internal resistance of the amplifier from the viewpoint of the output terminals is extremely low, a conventional voltmeter may be connected across these terminals for measuring the output voltage. This may be in the form of a milliampere meter 4 together with a series potentiometer resistor 5, say of approximately 50,000 ohms. Thus, if a current of $10^{-9}$ amperes flows through the resistance $R_2$ (which resistance may be about 20,000 megohms), $V_{DC}=V_{AC}=20$ volts, and the meter 4 will read 0.4 milliampere. The current amplification will be $0.0004/10^{-9}=4 \times 10^5$.

It will be understood that the feedback connection between the output 3b and input 3a of the amplifier 3 may be of conventional type, i. e. such that an appropriate portion (by preference, at least the major part of the "load" resistance) of the output plate circuit is connected in series with the input (grid) circuit of the amplifier. Thus as shown the output resistor 9, which is suitably connected between the plate voltage source and the cathode of the output plate circuit in a conventional manner for which illustration seems unnecessary, is arranged in series with the resistor $R_2$ across the input (grid-to-cathode) of the amplifier. As explained, the connections are advantageously such that the voltage thus fed back is of opposite polarity to that developed by the ion current through resistor $R_2$; and the feedback voltage should be of appropriate "phase," in that an increase of $V_{DC}$ should produce a corresponding increase of the opposed voltage $V_{AC}$, i. e. $GV_{DA}$, that is applied in the input circuit, and vice versa. Hence where the amplifier consists of an even number of electronic stages of the usual sort, a suitable fixed voltage source such as the battery 8, which may conveniently be a part of the plate supply for the output stage of the amplifier, is appropriately incorporated in the feedback circuit as shown to correct the actual "phase" of the voltage drop across the resistor 9. In this way the voltage $V_{AC}$ is produced by and always equal to the voltage of battery 8 minus the actual drop across the resistor 9; or in other words, increase or decrease of the latter voltage ($V_9$), produced under the described circumstances of amplification, will be converted to an equal decrease or increase of $V_{AC}$. It will be appreciated that alternative arrangements may be employed to insure proper polarity and "phase" of the feedback voltage, for instance by using an amplifier having an odd number of stages, with a simple output resistor connected for feedback, as will be readily understood by those skilled in the art.

Similarly to the effect in the circuit of collector 2, the ion current falling on collector 1 will cause a voltage drop $i_1R_1$ across resistor $R_1$. If the slidable contact arm of the potentiometer resistor 5 is made coincidental with point A, the highly sensitive amplifier 6 (denoted in block diagram form) will function on the usual "straight deflection" method, that is, galvanometer 7 or other similar measuring instrument will indicate the current flow through collector 1. However, if B is moved the proper distance to the right of A the voltage drop $V_{AB}$ can be made precisely equal to $i_1R_1$ where $i_1$ is the ion current flowing to the collector 1. Since $V_{AB}$ is now equal and opposite to $i_1R_1$ in series circuit therewith galvanometer 7 will now read zero. In other words, amplifier 6 together with galvanometer 7 acts as a null instrument to indicate when $V_{AB}=i_1R_1$. In many cases by means of a servo mechanism together with the proper control equipment it is possible by automatic means to continuously maintain $V_{AB}=i_1R_1$. The condition of unbalance can be automatically recorded while the automatic balancing is taking place.

The output of the feedback network provides the electromotive force for the potentiometer 5 as a dry cell would in a conventional potentiometer. There is, however, an important distinction in the present case, namely, the voltage $V_{AC}$ is automatically proportional to the current falling on collector 2. Thus, the balance point B is independent of variations in the ion current intensities provided both ion currents vary in the same way at the same time.

A simple analysis shows that the ratio of ion current of collector 1 with respect to collector 2, that is, the 1:2 ratio, equals $$\frac{R_2}{R_1}\times\frac{R_{AB}}{R_{AC}}$$

$R_2$ and $R_1$ may be 20,000 and 40,000 megohms respectively, however, these values are merely illustrative. It is desirable that they and particularly the total potentiometer resistance 5 be selected for convenient calibration of the potentiometer, for example so that $R_{AB}$ in ohms gives the ion current ratio in parts per 100,000 directly.

The zero-balance of the feedback amplifier is effected as follows: since the output voltage $V_{AC}$ is the difference between the voltage of battery 8 (which voltage may be about 45 volts) and the resistance drop in resistor 9 (which may be about 15,000 ohms), then, for no ion current arriving at collector 2, it is merely necessary to adjust resistors in the plate circuit of the feedback amplifier so that $V_{AC}=0$. However, since amplifier 6 together with galvanometer 7 is used entirely as a null instrument and the zero reading is determined by sweeping aside both ion beams in the ion source (e. g., by suitable deflecting means, not shown), it is not necessary that the feedback amplifier be balanced even approximately. This may be demonstrated as follows:

Assume that the feedback amplifier is in perfect balance, that is, with no ions falling on the collector 2, the output voltage $V_{AC}=0$. Now allow ions to strike the two collectors and adjust point B until the meter 7 of amplifier 6 indicates a balance, that is, $V_{FA}=0$. The true ratio of ion currents is then given by reading the position of the point B. Let $X=R_{AB}/R_{AC}$ for this condition. Thus, $i_{R_1}=XV_{AC}$.

Next assume that prior to measuring the ion current ratio the feedback amplifier has not been balanced precisely, that is, there exists an output voltage $V_{AC}0$ even before ions strike the collectors. Now allow the ions to strike the collectors and adjust the point B until shutting the ions on or off results in no change in the galvanometer reading. That is to say, adjust point B so that when the ions are on, the meter 7 has the same reading as it does when the ions are thereafter shut off—the point of balance being not zero but a definite voltage $V_{AF}0$. Let $y=R_{AB}/R_{AC}$ for this case. The potential of point F may then be written: for ions striking collectors—

$$i_1R_1-y(V_{AC}+V_{AC}0)$$

for ions shut off—

$$-yV_{AC}0$$

equating these two quantities—

$$i_1R_1=yV_{AC}$$

However, it was shown before that $i_1R_1=XV_{AC}$. Thus, $x=y$. Stated otherwise, this means that the ratio determination is independent of the feedback amplifier balance. In some cases, however, even where advantage is taken of this independence, it may be desirable for the feedback amplifier to be at least roughly balanced so that a high sensitivity can be used in the amplifier-meter combination, 6, 7, without running the meter off scale.

It will be observed that the above described system will be effective to give in a single reading a precise measurement of the ratio or relative abundance of materials of different mass, occurring simultaneously—further, that the feedback network provides a convenient and simple means of reversing the polarity of one of the positive voltages (with respect to ground) produced by the collectors, so as to make it possible: (1) to apply the voltages to a potentiometer while still providing a direct connection to ground for one of the terminals of each amplifier, and (2) to use a null method for balancing such voltages to determine their relative values by the potentiometer setting. Thus in operation of the system illustrated, for example, all that is necessary is to adjust and read either manually or automatically the position of point B, or the resistance ratio AB:AC, for a null reading of the meter 7, such null reading being either zero, if the amplifier 3 is balanced, or if the amplifier is not balanced, a particular reading which is found to be the same for both the presence and absence of ion beams at the collectors.

When amplifier 3 is balanced and no ion current is flowing, both ion collectors are maintained at substantially ground potential. However, when ion current is flowing to the ion collectors point F is at ground potential, assuming point B is adjusted for balance, but point D will not be at ground potential. The maintenance of these points at near ground potential is advantageous, particularly in the operation of high powered devices. Furthermore, since resistors $R_1$ and $R_2$ are extremely large in comparison with the potentiometer 5 or resistor 9, then it may be said that substantially the complete voltage drop due to ion currents appears across resistors $R_1$ and $R_2$ whereby maximum advantage is taken of the current output of the spectrometer for measuring purposes. The relatively large values of resistors $R_1$ and $R_2$ compare to resistor 5 contribute to the accuracy of measurement made by determining the resistance ration AB:AC, in that changes of ion current from collector 1 will have no appreciable effect on the voltage across AB that is intended to be determined solely by the output of the amplifier for collector 2. In addition, the use of extremely large resistors $R_1$ and $R_2$ provides a relatively substantial voltage drop across each, thus greatly enhancing the sensitivity of the instrument. At the same time, the complete circuit including the amplifiers and potentiometer 5 permits the use of the advantageous null method that might otherwise be difficult to apply for a very small current. In this connection it should be noted that the feedback network has unit voltage amplification but has a current amplification of about $4 \times 10^5$ thereby producing a relatively large current in resistor 5, disposing of the necessity of using an additional source such as a battery for energizing potentiometer resistor 5. In other words, the output of the feedback amplifier and network comprises the sole energizing source for potentiometer resistor 5, and it is a variable source instead of being constant as in the case of a battery.

It will also be noted that by the above described circuit the ratio of ion currents may be measured by making a single adjustment, that is of point B. Such adjustment a direct reading of the ion current ratio.

It will be apparent that the above described system is merely illustrative and not limitative of the invention and that similar schemes may be devised without departing from the spirit of the present invention.

We claim:

1. A direct current electrical measuring system comprising, in combination, means for developing two direct current voltages having the same polarity with respect to ground, a potentiometer resistor having outer terminals and an adjustable inner terminal, negative feedback amplifying means for reversing one of said voltages with respect to ground and amplifying the current developing said voltage by at least $10^5$ times and for applying the reversed voltage and amplified current across said outer terminals of said potentiometer resistor, and means for nulling, by the other of said voltages, the voltage portion existing between an outer terminal and said inner terminal of said potentiometer resistor to determine the ratio of said voltages by the setting of said inner terminal.

2. Apparatus for measuring simultaneously the relative concentration of a plurality of materials comprising, in combination, a mass spectrometer including an ion source of such materials of different masses, electrical means for separating ions of said materials in accordance with their respective masses, and a plurality of collecting electrodes for simultaneously collecting said ions, each collecting electrode collecting ions of the same mass, and electrical means including a potentiometer resistor for effectively nullifying one of the collected ion currents against the other, and for measuring the ratio of said collected ion currents by the setting of said potentiometer, said potentiometer resistor being energized solely by currents that are a functional of the values of the respective collected ions.

3. Apparatus for measuring the ratio of concentration of two materials having different masses comprising, in combination, a mass spectrometer having an ion source of said materials, means for collimating and accelerating the ions of said materials, electrical means for separating said ions in accordance with their different masses, and a pair of collecting electrodes for collecting said ions, each collecting electrode collecting ions of the same mass, a resistor in electrical relationship with each of said collecting electrodes for developing voltages proportional to the respective collected ion currents, variable resistance means energized solely by currents that are a function of said ion currents for balancing a portion of one of said voltages against the other, and an electrical meter for indicating when said balance has been attained, the setting of said variable resistance means when balance has been attained being indicative of the ratio of the respective voltages produced across said resistors by the collected ion currents.

4. Apparatus as recited in claim 3 in which said variable resistance means comprises a potentiometer and one of said voltages developed by one of said ion currents is in opposition to a portion of the other voltage in a portion of said potentiometer while said other voltage developed by the other ion current is applied across the entire potentiometer.

5. Apparatus for measuring the ratio of concentration of two materials having different masses comprising, in combination, a mass spectrometer having an ion source of said materials, means for collimating and accelerating the ions of said materials, electrical means for separating said ions in accordance with their different masses, and a pair of collecting electrodes for collecting said ions, each collecting electrode collecting ions of the same mass, a resistor in electrical relationship with each of said collecting electrodes for developing voltages proportional to the respective collected ion currents, an amplifier in circuit relationship with each of said resistors, means connected to one of said amplifiers for effecting reversal of one of said voltages, a potentiometer connected in circuit relationship with each of said resistors and amplifiers as well as said voltage reversing means so that one of said voltages is in series with the variable portion of said potentiometer and the other of said voltages, after reversal by said voltage reversing means, is applied across the entire potentiometer, and an electrical meter connected to the output of one of said amplifiers for determining when said voltages in series with said variable portion of the potentiometer completely nullify each other, thereby giving an indication of the ratio of collected ion currents from the setting of said potentiometer.

6. Apparatus as recited in claim 5 in which said amplifier having means for effecting reversal of its input voltage comprises a negative feedback network of unit voltage amplification.

7. Apparatus for measuring the ratio of concentration of two materials having different masses comprising, in combination, a mass spectrometer having an ion source of said materials, means for collimating and accelerating the ions of said materials, electrical means for separating said ions in accordance with their different mass-to-charge ratios and a pair of collecting electrodes for collecting said ions, each collecting electrode collecting ions of the same mass-to-charge ratio, a resistor in electrical relationship with each of said collecting electrodes for developing voltages proportional to the respective collected ion currents, and amplifier connected in circuit relationship with each of said resistors, means connected to one of said amplifiers for effecting reversal of its input voltage, a potentiometer having outer terminals connected in series with one of said resistors and in series with said reversing means and having inner terminals connected in series with the other of said resistors such that the voltages in series relationship with the inner terminals are in bucking relationship, an electrical null meter for indicating when said last mentioned voltages completely nullify each other, the setting of the potentiometer thereby indicating the ratio of collected ion currents.

8. Apparatus as recited in claim 7 in which the amplifier connected across the outer terminals of said potentiometer together with said voltage reversing means comprises a negative feedback network of unit voltage amplification.

9. Apparatus for measuring the ratio of concentration of two materials having different masses comprising, in combination, a mass spectrometer having an ion source of said materials, means for collimating and accelerating the ions of said materials, electrical means for separating said ions in accordance with their different masses, and a pair of collecting electrodes for collecting said ions, each collecting electrode collecting ions of the same mass, a resistor in electrical relationship with each of said collecting electrodes for developing voltages proportional to the respective collected ion currents, means for reversing the polarity of one of said voltages, a potentiometer having outer terminals connected in series with said voltage reversing means associated with one of said resistors and having inner terminals connected in series with the other of said resistors, the voltages in series with said inner terminals being in bucking relationship, and an electrical meter for denoting when the potentiometer has been adjusted so that the resultant of said bucking voltages is zero whereby the setting of the potentiometer is indicative of the ratio of collected ion currents.

10. Apparatus for measuring the ratio of concentration of two materials having different masses comprising, in combination, a mass spectrometer having an ion source of said materials, means for collimating and accelerating the ions of said materials, electrical means for separating said ions in accordance with their different masses, and a pair of collecting electrodes for collecting said ions, each collecting electrode collecting ions of the same mass, a resistor in electrical relationship with each of said collecting electrodes for developing positive voltages with respect to ground proportional to the respective collected ion currents, electrical means for reversing the polarity of one of said voltages with respect to ground, a potentiometer for balancing the remaining positive voltage against a portion of the voltage of reversed polarity by adjustment thereof, and an electrical meter for indicating the attainment of balance of said voltages, the adjustment of said potentiometer at balance being indicative of the ratio of collected ion currents.

11. Apparatus recited in claim 10 in which said electrical means for reversing polarity of one of said voltages comprises a negative feedback network.

12. A direct current electrical measuring system comprising, in combination, means for developing two direct current voltages having the same polarity with respect to ground, a potentiometer resistor having outer terminals and an adjustable inner terminal, means for reversing one of said voltages with respect to ground and amplifying the current developing said voltage by many times and for applying the reversed voltage and amplified current across said outer terminals of said potentiometer resistor, and means for nulling, by said other voltage, the voltage portion existing between an outer terminal and said inner terminal of said potentiometer resistor to determine the ratio of said first-mentioned voltages by the setting of said inner terminal.

ALFRED O. C. NIER.
EDWARD P. NEY.

REFERENCES CITED

The following references are of record in the file of this patent:

UNITED STATES PATENTS

| Number | Name | Date |
|---|---|---|
| 1,727,388 | Affel | Sept. 10 1929 |
| 2,111,235 | Avins | Mar. 15, 1938 |
| 2,143,219 | Wenger | Jan. 10, 1939 |
| 2,341,551 | Hoover | Feb. 15, 1944 |
| 2,355,658 | Lawlor | Aug. 15, 1944 |

Certificate of Correction

Patent No. 2,456,426. December 14, 1948.

ALFRED O. C. NIER ET AL.

It is hereby certified that errors appear in the printed specification of the above numbered patent requiring correction as follows:

Column 5, line 15, for "$iR_1 = XV_{AC}$" read $i_{R_1}R_1 = XV_{AC}$; column 6, line 43, after the word "adjustment" insert *gives*;

and that the said Letters Patent should be read with these corrections therein that the same may conform to the record of the case in the Patent Office.

Signed and sealed this 28th day of June, A. D. 1949.

[SEAL]

THOMAS F. MURPHY,
*Assistant Commissioner of Patents.*